Patented Nov. 22, 1932

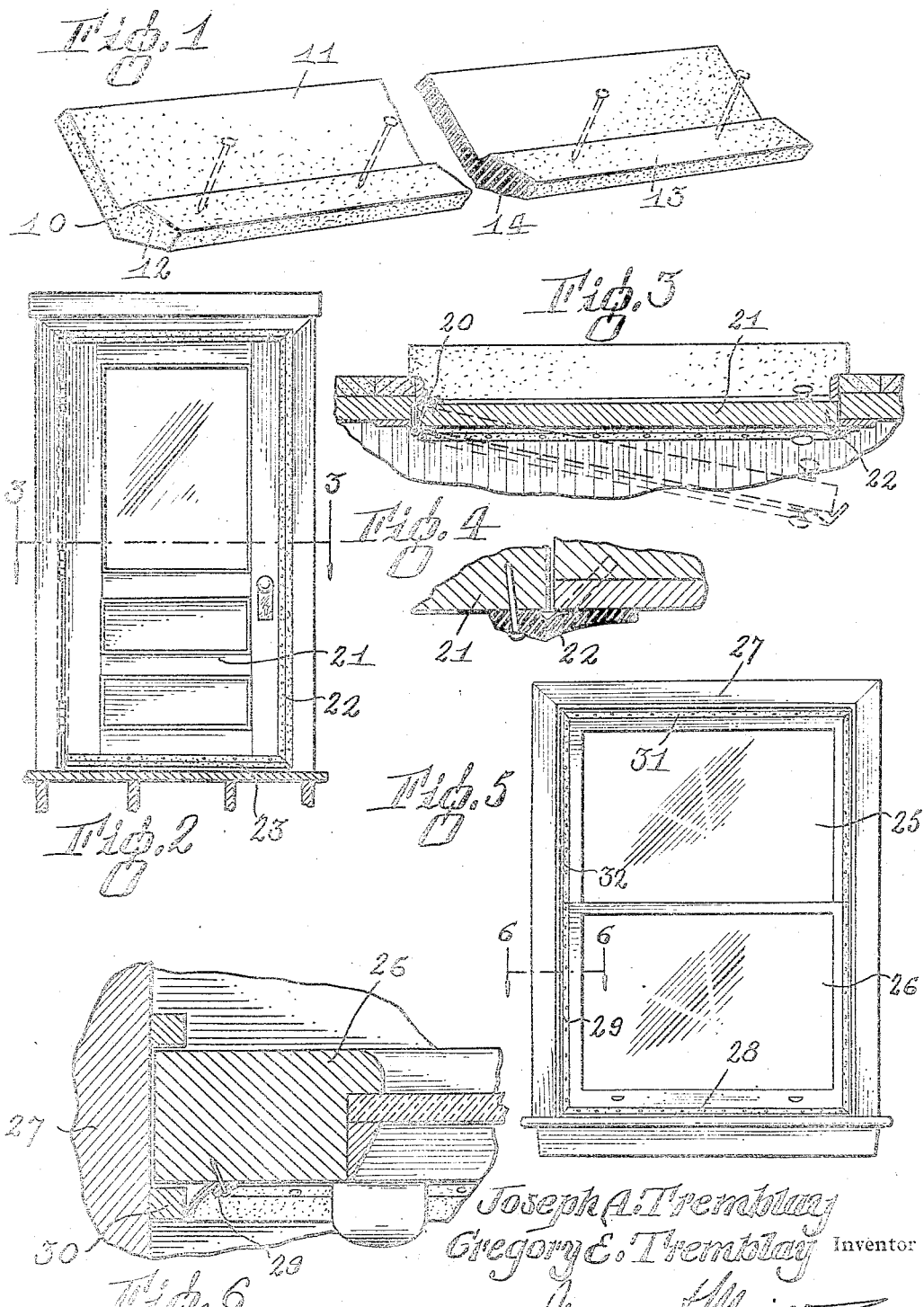

1,888,299

UNITED STATES PATENT OFFICE

JOSEPH A. TREMBLAY AND GREGORY E. TREMBLAY, OF DOLBEAU, QUEBEC, CANADA

WEATHER STRIP

Application filed February 28, 1931, Serial No. 519,224, and in Canada October 31, 1930.

The present invention relates to improvements in weather strips and has for its primary object the provision of a weather strip designed for use in conjunction with doors, windows and other closure elements.

A further object of the invention is the provision of a weather strip constructed particularly for use in conjunction with movable closure elements and designed for permanent connection with one movable element and removable contact with another to form a tight seal over the crevices therebetween.

A still further object of the invention is the provision of a weather strip of resilient construction so as to form an air tight seal between a movable closure element and the frame when the element is in closed position and at the same time avoid interference with free opening movement thereof.

Another object of the invention is the provision of a weather strip of the above character which is simple in construction and which may be readily associated with closure elements of various types.

Other objects and advantages of the invention will become apparent as the description progresses.

In the accompanying drawing forming a part of this specification and in which like reference characters are employed to designate corresponding parts throughout the same:

Figure 1 is a perspective view of a weather strip constructed in accordance with the present invention, Figure 2 is an elevational view showing the improved weather strip attached to a door, Figure 3 is an enlarged transverse sectional view taken on the line 3—3 of Figure 2, Figure 4 is an enlarged fragmentary sectional view showing the connection of the weather strip with a closure element and the position thereof when the element is in closed position, Figure 5 is an interior elevational view of a window equipped with the improved weather strip, and Figure 6 is an enlarged fragmentary transverse section taken on the line 6—6 of Figure 5.

Referring to the drawing, wherein for the purpose of illustration is shown a preferred embodiment of the invention, the numeral 10 generally designates a section of the weather strip which is in the form of an elongated relatively narrow strip of material having an angular cross section. One side of the strip is in the form of a relatively thin flat flange portion 11. The opposed side is preferably in the form of a relatively thick pad 12 formed with an increasing taper from the outer edge toward the juncture with the opposed side flange 11, as shown to advantage in Figure 1. The cross sectional contour of the strip 10 is preferably designed so that the side portions 11 and 12 will be disposed at an obtuse angle, the purpose of which will be later described.

Inasmuch as it is desirable that the strip, particularly the flange forming the side portion 11 embody characteristics of flexibility as well as resiliency, it is contemplated to construct the same of rubber, rubber composition or similar material. In applying the strip 10 to a closure element, the pad portion 12 may be disposed with face 13 or the face 14 against the closure member.

In employing the weather strip in association with a door, as for instance the door structure shown in Figures 2 to 4 inclusive, which is mounted to swing inwardly of the building, one strip or section is attached to the outer side of the door at the edge margin at the hinged side. This strip, indicated at 20, is disposed so that the face 14 is positioned against the door 21 and the resilient flange portion 11 contacting with the door frame. Additional strips are likewise attached to the inner side of the door at the outer or free edge margins as well as the upper and lower transverse edge margins. These strips, indicated at 21 and 22 respectively, are disposed so that the face 13 of the pad portion of the strip is positioned against the door and fastened thereto by nails or other securing elements. When the door is swung to an open position, the flange of the strip 20 as well as the flanges of the strips 22 and 23 will be swung away from and disengage the door frame, causing the flange to assume its normal angular position with respect to the pad portion 12. When the door is swung to a closing position, the flange of the strip 20 will be resiliently urged against the exterior portion of the door frame while the flanges of the strips 22 and 23 will be resiliently pressed against the marginal side portions at the interior of the door frame so as to tightly seal the crevices about the door.

When it is desired to attach the weather strips to a window, as for instance the double hung window shown in Figures 5 and 6 and embodying upper and lower sashes 25 and 26 as well as the frame 27, the strips are associated with the sashes to move therewith. Thus a bottom strip 28 as well as side strips 29 are attached to the bottom edge and side edge margins of the sash frame with the face 14 of each strip positioned against the sash. The flanges of the side strips 29 will be constantly forced, by the resiliency thereof, against the sash stop 30, while the flange of the lower strip 28 will be forced into engagement with the bottom rail of the frame when the sash is lowered or removed therefrom when the sash is raised. The upper sash 25 carries an upper sash strip 31 and side sash strips 32 which co-operate with the window frame in a manner similar to the co-operation of the strips 28 and 29 of the lower sash.

Thus, it will be seen, that the present weather strip can be readily connected with various forms of swinging, sliding and otherwise adjustable closure elements to effectively seal the crevices thereof when the elements are closed. Furthermore, the particular construction and connection of the strips will afford convenient operation of the closures as well as long life of the strip material.

It is to be understood that the form of our invention herein shown and described is to be taken as a preferred example of the same, and that various changes as to the shape, size, and arrangement of parts may be resorted to without departing from the spirit of the invention or the scope of the subjoined claim.

Having thus described our invention, we claim:—

In a weather strip made entirely of rubber, a relatively thick base pad adapted to be secured to a carrier member, said pad being of tapered cross section, and a flexible flange formed integral with the pad and extending angularly from one face of the pad, said flange being of substantially equal thickness joins the other face of the pad below the apex represented by the maximum thickness of the pad and a portion of the pad extending from said apex and decreasing in thickness to meet the said flange, the flange being adapted to resiliently contact with a stationary member adjacent the carrier member.

In witness whereof we have hereunto set our hand.

JOSEPH A. TREMBLAY.
GREGORY E. TREMBLAY.